(12) United States Patent
Murakami et al.

(10) Patent No.: US 8,707,109 B2
(45) Date of Patent: Apr. 22, 2014

(54) COMPUTER APPARATUS, NON-TRANSITORY COMPUTER-READABLE MEDIUM STORING AN ERROR RECOVERY CONTROL PROGRAM, AND ERROR RECOVERY CONTROL METHOD

(75) Inventors: Takeo Murakami, Kawasaki (JP); Masahide Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 13/064,920

(22) Filed: Apr. 26, 2011

(65) Prior Publication Data

US 2012/0011397 A1 Jan. 12, 2012

(30) Foreign Application Priority Data

Jul. 6, 2010 (JP) ................................. 2010-153812

(51) Int. Cl.
*G06F 11/00* (2006.01)

(52) U.S. Cl.
USPC ............................................... 714/55; 714/2

(58) Field of Classification Search
USPC ............................................................ 714/55
See application file for complete search history.

(56) References Cited

U.S. PATENT DOCUMENTS

| | | | | |
|---|---|---|---|---|
| 7,779,305 B2 * | 8/2010 | Zimmer et al. | ............ | 714/38.13 |
| 8,082,469 B2 * | 12/2011 | Kobayashi et al. | ............. | 714/23 |
| 2006/0064523 A1 * | 3/2006 | Moriki et al. | .................... | 710/62 |
| 2006/0107168 A1 * | 5/2006 | Chang | ............................ | 714/749 |
| 2008/0189570 A1 * | 8/2008 | Terashima et al. | ................ | 714/2 |
| 2009/0172471 A1 * | 7/2009 | Zimmer et al. | ................. | 714/17 |
| 2010/0037097 A1 * | 2/2010 | Kobayashi et al. | ............. | 714/19 |

FOREIGN PATENT DOCUMENTS

| | | |
|---|---|---|
| JP | 06-230992 | 8/1994 |
| JP | 2006-085543 | 3/2006 |
| JP | 2008-186209 | 8/2008 |
| JP | 2009-151509 | 7/2009 |

* cited by examiner

*Primary Examiner* — Kamini Patel
(74) *Attorney, Agent, or Firm* — Staas & Halsey LLP

(57) ABSTRACT

A computer apparatus includes a managing unit realizing virtual computers including device driver virtual computers and user virtual computers, the user virtual computers communicating with various devices via the device driver virtual computers. Error detection information is received from one of the virtual computers upon detection of error in one of the device drivers used for communication with one of the devices in one of the virtual computers. One or more types of the virtual computers and the contents of recovery process corresponding to the type of device driver and the type of error indicated in the received error detection information are acquired from error recovery control information. A recovery instruction is transmitted to one or more of the virtual computers identified by the one or more acquired types of virtual computers in order to cause the one or more identified virtual computers to perform the acquired contents of the recovery process.

5 Claims, 8 Drawing Sheets

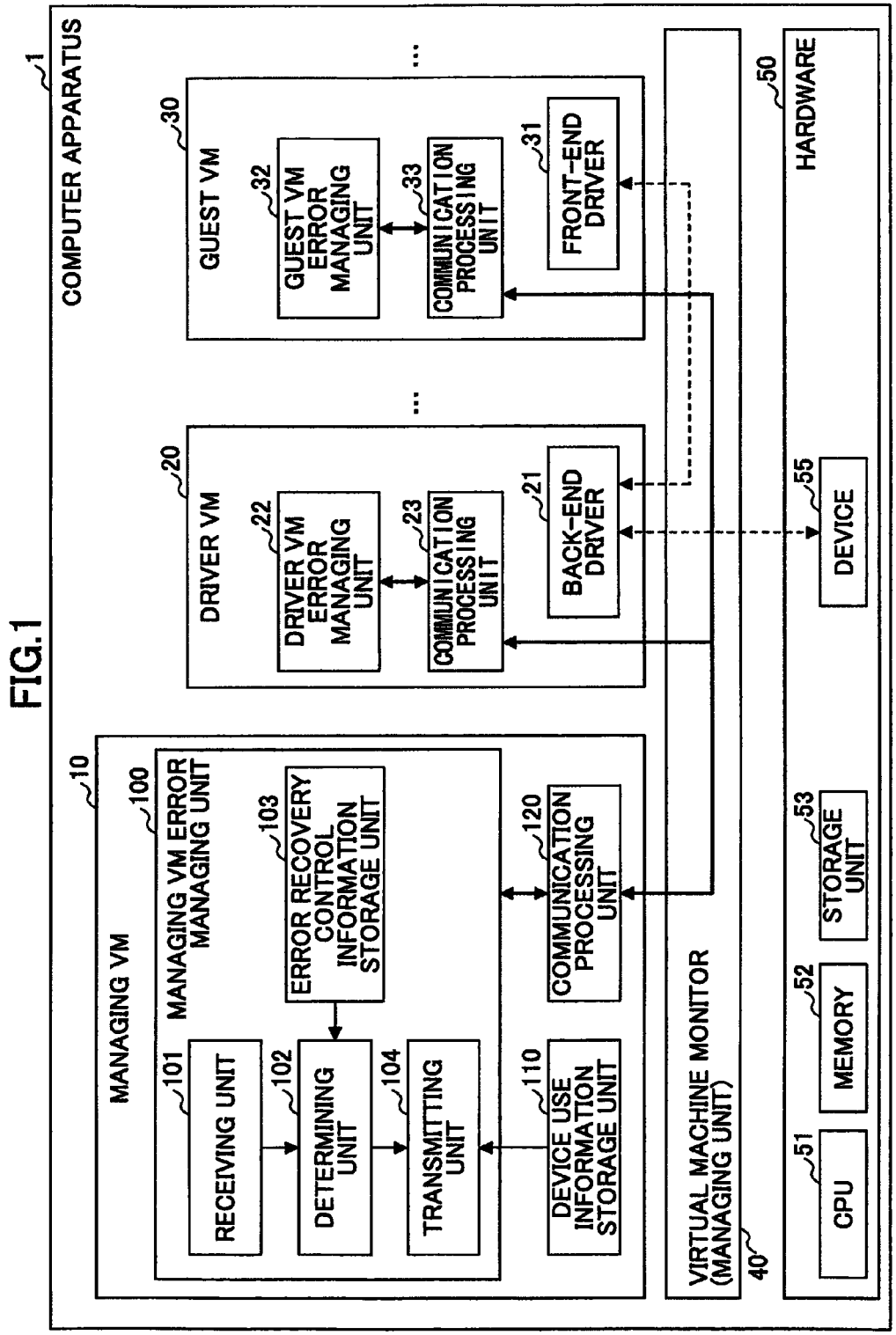

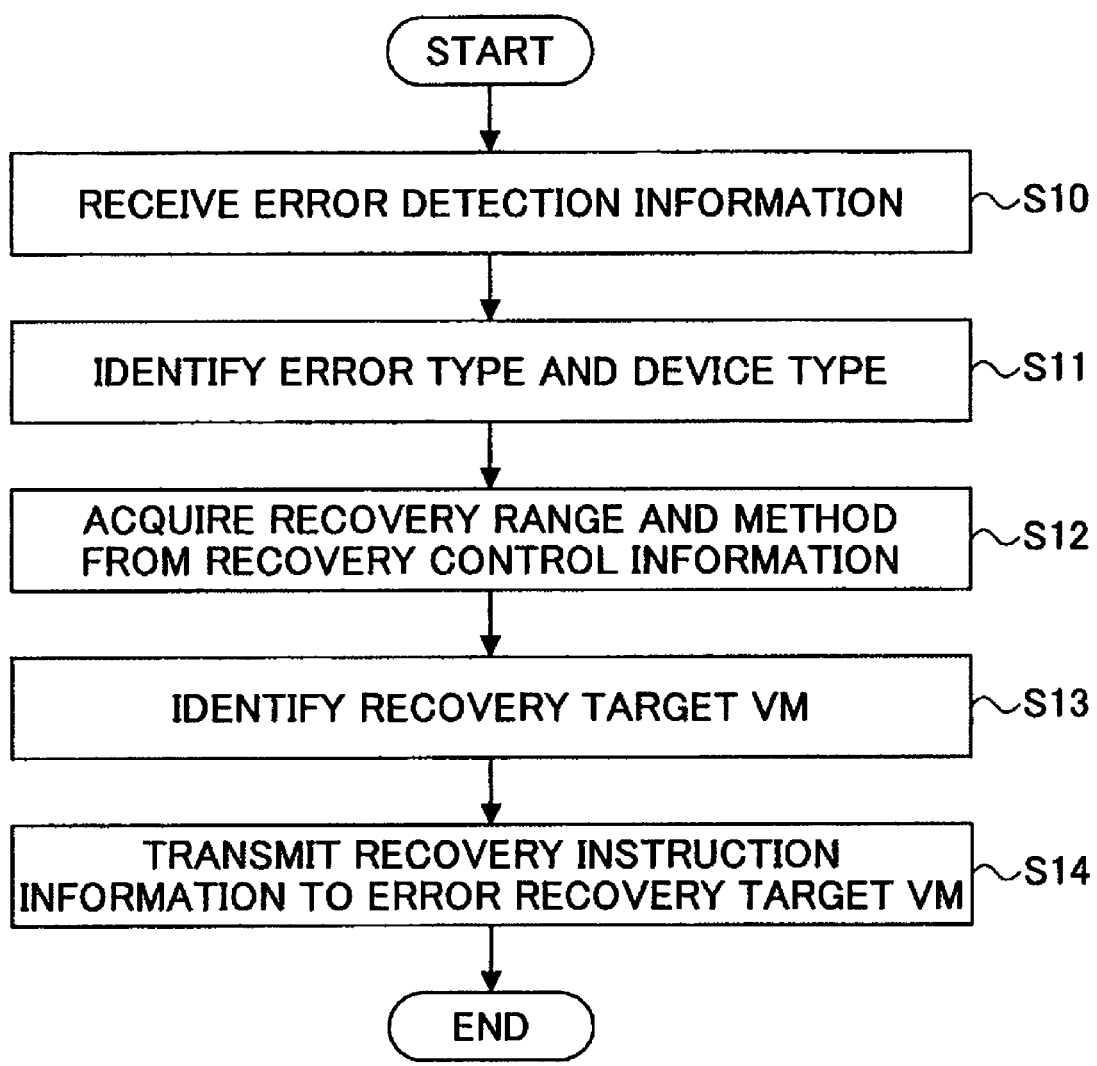

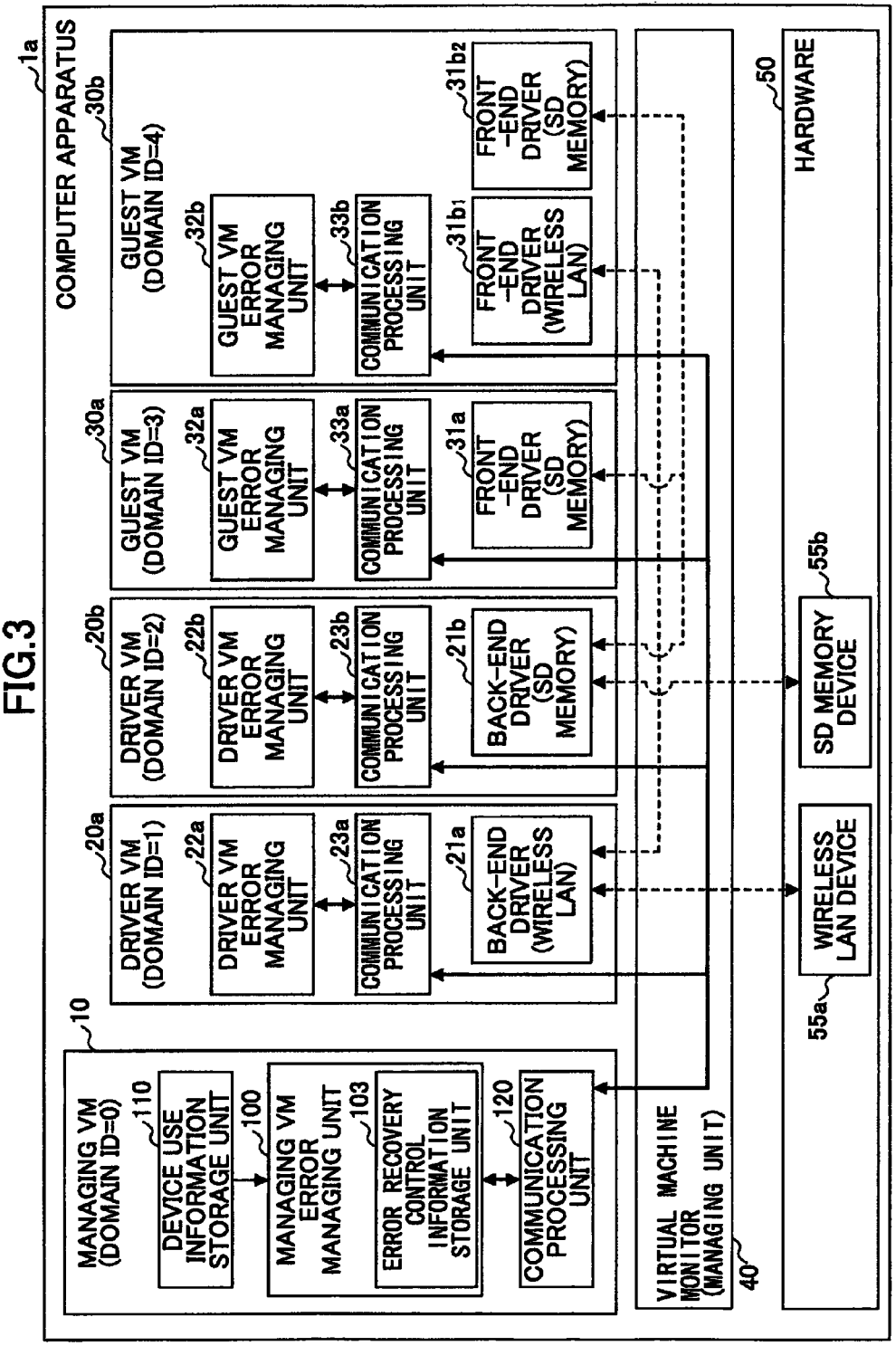

FIG.4

ERROR RECOVERY CONTROL INFORMATION 150

| ERROR TYPE | DEVICE TYPE | RECOVERY RANGE | RECOVERY METHOD |
|---|---|---|---|
| NO BACK-END-DRIVER RESPONSE | WIRELESS LAN | DRIVER VM (BACK-END DRIVER) | REBOOT DRIVER (DEVICE INITIALIZATION APPROPRIATE) |
| | | GUEST VM (FRONT-END DRIVER) | REATTACH DRIVER |
| | SD MEMORY | DRIVER VM (BACK-END DRIVER) | REBOOT DRIVER (DEVICE INITIALIZATION NOT APPROPRIATE) |
| | | GUEST VM (FRONT-END DRIVER) | REATTACH DRIVER |
| MEMORY PROTECTION VIOLATION | WIRELESS LAN | DRIVER VM (ALL) | REBOOT DRIVER VM (DEVICE INITIALIZATION APPROPRIATE) |
| | SD MEMORY | DRIVER VM (ALL) | REBOOT DRIVER VM (DEVICE INITIALIZATION NOT APPROPRIATE) |

FIG.5

```
typedef struct table_entry {
    int error_no;
    int deviceid;
    int recover_range;
    int recover_method;
    int recover_opt;
} table_entry_t;

define MAXENTRIES  1000 table_entry_t recovery_table[MAXENTRIES];
```
⎤ DEFINITION OF ERROR RECOVERY CONTROL INFORMATION TABLE

```
/* error type */
#define ERR_NORESPONSE_BACKENDDRV    1
#define ERR_MEMPROT_FAULT            2
```
⎤ ERROR TYPE DEFINITION

```
/* device type */
#define DEV_WIRELESS_LAN    1
#define DEV_SD_MEMORY       2
#define DEV_LCD             3
#define DEV_KEYPAD          4
```
⎤ DEVICE TYPE DEFINITION

```
/* recovery range */
#define RNG_BACKEND_DRIVER    1
#define RNG_DRIVER_VM         2
#define RNG_GUEST_VM          3
#define RNG_FRONTEND_DRIVER   4
```
⎤ RECOVERY RANGE DEFINITION

```
/* recovery method */
#define RCV_DRIVER_DETATCH    1
#define RCV_DRIVER_REBOOT     2
#define RCV_OS_REBOOT         3
#define RCV_SYSTEM_REBOOT     4
```
⎤ RECOVERY METHOD DEFINITION

```
/* recovery method option */
#define RCVOPT_NO_DEVRESET    0x01
```
⎤ RECOVERY METHOD OPTION DEFINITION

FIG.6

DEVICE USE INFORMATION 151

| DEVICE TYPE (DEVICE ID) | FRONT-END VM (DOMAIN ID) | BACK-END VM (DOMAIN ID) | STATUS |
|---|---|---|---|
| WIRELESS LAN (DEVICE ID=1) | GUEST VM (DOMAIN ID=4) | DRIVER VM (DOMAIN ID=1) | CONNECTED |
| SD MEMORY (DEVICE ID=2) | GUEST VM (DOMAIN ID=3) | DRIVER VM (DOMAIN ID=2) | CONNECTED |
| SD MEMORY (DEVICE ID=2) | GUEST VM (DOMAIN ID=4) | DRIVER VM (DOMAIN ID=2) | CONNECTED |

FIG.7A

ERROR DETECTION INFORMATION

| Source Domain ID | Error Domain ID | Error No | Device ID |
|---|---|---|---|

FIG.7B

RECOVERY INSTRUCTION INFORMATION

| Rcv_range | Rcv_method | Rcvopt | Device ID |
|---|---|---|---|

FIG.7C

RECOVERY RESULT INFORMATION

| Source Domain ID | Device ID | result |
|---|---|---|

COMPUTER APPARATUS, NON-TRANSITORY COMPUTER-READABLE MEDIUM STORING AN ERROR RECOVERY CONTROL PROGRAM, AND ERROR RECOVERY CONTROL METHOD

CROSS-REFERENCE TO RELATED APPLICATIONS

This application is based upon and claims the benefit of priority of Japanese Patent Application 2010-153812, filed on Jul. 6, 2010, the entire contents of which are incorporated herein by reference.

FIELD

The disclosures herein relate to computer apparatuses in which virtualization technology is introduced. Particularly, the disclosures relate to a computer apparatus capable of performing a recovery operation for a device driver error, a non-transitory computer-readable medium storing an error recovery control program, and an error recovery control method.

BACKGROUND

A virtualization technology enables plural virtualized computers to operate on a single physical computer. The computers virtualized by the virtualization technology may be referred to as "virtual computers" or "virtual machines". In the computer in which such virtualization technology is introduced, a device implemented on or connected to the computer may be shared by the plural virtual machines (which may be referred to as "VMs") operating on the computer. In this case, the virtual machines use a device driver in order to utilize the device.

In recent years, a "split driver" technology has been proposed whereby a device driver is separated into a front-end and a back-end which are implemented on the virtual machines so that the device or the corresponding device driver can be commonly utilized by the virtual machines. In this technology, a back-end device driver that actually controls the device is implemented on a dedicated virtual machine. When the other virtual machines wish to utilize the device, they do so via the dedicated virtual machine in which the device driver is implemented. By introducing such technology, the burden of developing drivers for the individual virtual machines can be reduced.

In a computer in which such virtualization technology is introduced, in case a device driver error occurs, error recovery may be attempted by rebooting the entire virtualized system including a virtual machine monitor.

A technology is also known in which a user logic partition utilized by a user and an I/O logic partition including an I/O device are independently configured so that the user logic partition can be prevented from being affected by an I/O device error. In another known technology, error occurrence information from guest OS's are centrally collected at a host OS as an error managing VM. In another known technology, in the event of an error in a constituent element of a system, a substitute constituent element is located and caused to perform a substitute process for the constituent element having the error. In another technology, a hypervisor monitors a physical I/O device for development of error. Upon occurrence of error, a managing virtual computer is notified and then performs an error recovery process for the physical I/O device.

Patent Document 1: Japanese Laid-open Patent Publication No. 2006-85543
Patent Document 2: Japanese Laid-open Patent Publication No. 2009-151509
Patent Document 3: Japanese Laid-open Patent Publication No. 06-230992
Patent Document 4: Japanese Laid-open Patent Publication No. 2008-186209

In the above method whereby the entire virtualized system is rebooted, application programs or virtual machines that are not related to the erroneous device driver are terminated and rebooted. Rebooting of the virtualized system as a whole also takes a very long time.

Further, in the case of the above structure of the device driver in a virtualized system, an appropriate range of virtual machines for the device driver error recovery process and the error recovery method may vary depending on the configuration of the virtual machines, the type of device, or the type of error. Thus, it is not easy to detect a device driver error or to limit the extent of the error recovery process such that processes not related to the error are not affected.

SUMMARY

In one embodiment, a computer apparatus includes a managing unit realizing virtual computers including device driver virtual computers and user virtual computers, the user virtual computers communicating with various devices via the device driver virtual computers under the control of the managing unit; a receiving unit receiving error detection information from one of the virtual computers upon detection of error in one of the device drivers used for communication with one of the devices in the one of the virtual computers, the error detection information including a type of the device driver in which the error is detected and a type of the error; an error recovery control information storage unit storing error recovery control information defining types of virtual computers as a recovery process target and the contents of a recovery process performed in one or more of the virtual computers of a corresponding type in the event of error, in association with types of device drivers and types of error that can occur in the device drivers; a determining unit acquiring one or more types of virtual computers and the contents of recovery process corresponding to the type of device driver and the type of error indicated in the received error detection information from the error recovery control information; and a transmitting unit transmitting a recovery instruction to one or more of the virtual computers identified by the one or more acquired types of virtual computers in order to cause the one or more identified virtual computers to perform the acquired contents of the recovery process.

In another embodiment, a non-transitory computer-readable recording medium records an error recovery control program to be executed by a computer apparatus. The program causes the computer apparatus to realize virtual computers including device driver virtual computers and user virtual computers, the user virtual computers communicating with various devices via the device driver virtual computers under the control of a managing unit of the computer apparatus; receive error detection information from one of the virtual computers upon detection of error in one of the device drivers used for communication with one of the devices in the one of the virtual computers, the error detection information including a type of the device driver in which the error is detected and a type of the error; acquire one or more types of virtual computers and the contents of recovery process corresponding to the type of device driver and the type of error indicated in the received error detection information from error recovery control information defining types of virtual computers as a recovery process target and the contents of a recovery process performed in one or more of the virtual computers of a corresponding type in the event of error, in association with types of device drivers and types of error that can occur in the device drivers; and transmit a recovery instruction to one or more of the virtual computers identified by the acquired one or more types of virtual computers in order to cause the one or more identified virtual computers to perform the acquired contents of the recovery process.

In another aspect, an error recovery control method performed by a computer apparatus includes realizing virtual computers including device driver virtual computers and user virtual computers, the user virtual computers communicating with various devices via the device driver virtual computers under the control of a managing unit of the computer apparatus; receiving error detection information from one of the virtual computers upon detection of error in one of the device drivers used for communication with one of the devices in the one of the virtual computers, the error detection information including a type of the device driver in which the error is detected and a type of the error; acquiring one or more types of virtual computers and the contents of recovery process corresponding to the type of device driver and the type of error indicated in the received error detection information from error recovery control information defining types of virtual computers as a recovery process target and the contents of a recovery process performed in one or more of the virtual computers of a corresponding type in the event of error, in association with types of device drivers and types of error that can occur in the device driver; and transmitting a recovery instruction to one or more of the virtual computers identified by the acquired one or more types of virtual computers in order to cause the one or more identified virtual computers to perform the acquired contents of the recovery process.

The object and advantages of the disclosure will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 1 is a block diagram of a computer apparatus according to an embodiment;

FIG. 2 is a flowchart of an error recovery control process according to the present embodiment;

FIG. 3 is a block diagram of a computer apparatus according to an Example;

FIG. 4 illustrates an example of error recovery control information according to the Example;

FIG. 5 illustrates an example of error recovery control information according to the Example;

FIG. 6 illustrates an example of device use information according to the Example;

FIGS. 7A, 7B, and 7C illustrate examples of data structures of various information used in error recovery control according to the Example.

DESCRIPTION OF EMBODIMENTS

Figure 8:
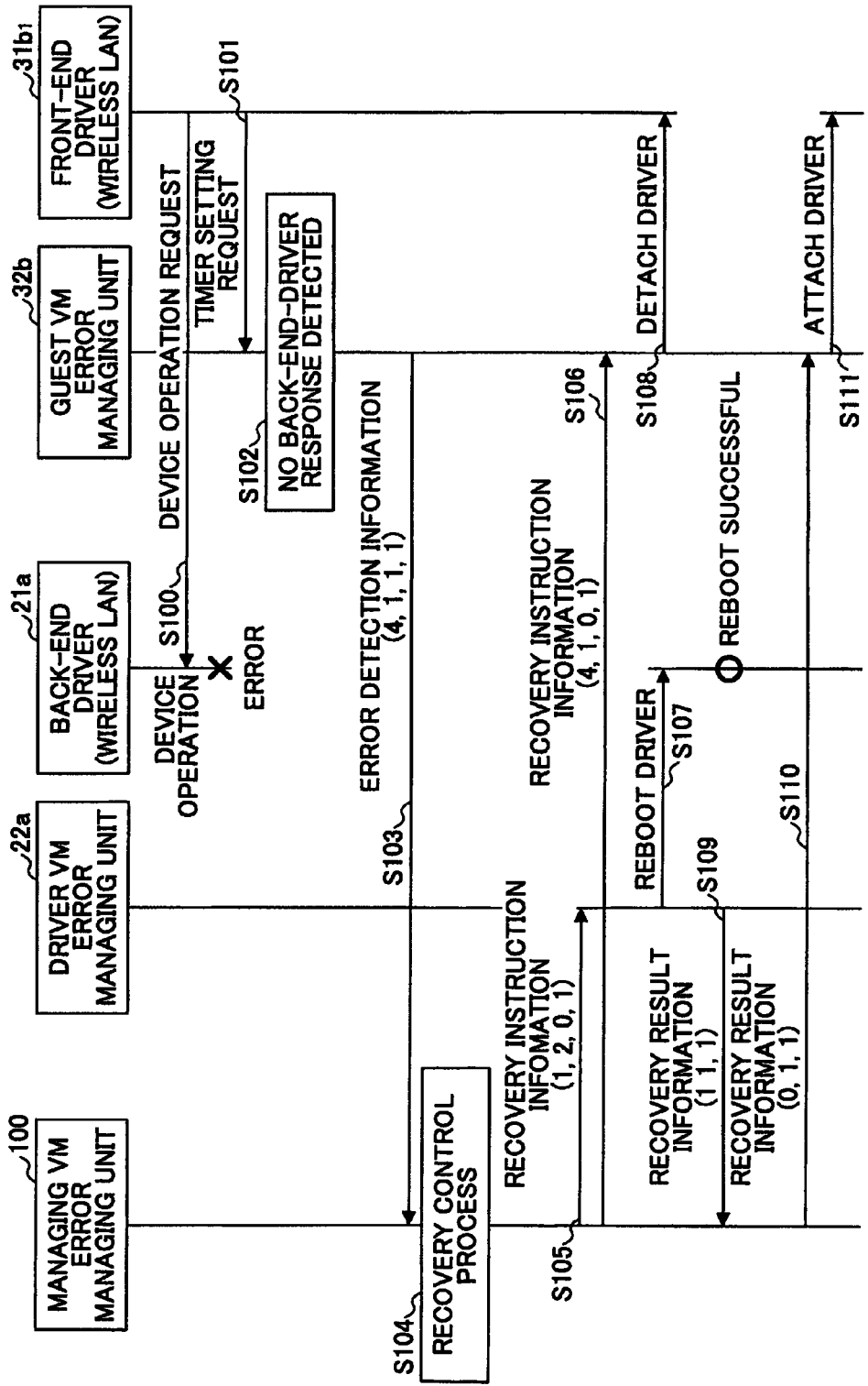
FIG. 8 is a process sequence chart of the error recovery control upon occurrence of a device driver error according to the Example.

Referring now to the drawings, wherein like reference numerals designate identical or corresponding parts throughout the several views, FIG. 1 is a block diagram of a computer apparatus 1 according to an embodiment. The computer apparatus 1 employs virtualization technology, and plural virtualized computers are operated on the computer apparatus 1. The virtualized computers may be referred to as "virtual machines" ("VM") or "virtual computers". The computer apparatus 1 includes a managing VM 10, a driver VM 20, a guest VM 30, and a virtual machine monitor 40.

The virtual machine monitor 40, which may be referred to as a "hypervisor" or a "virtualized OS", includes a virtual machine managing unit for enabling the computer apparatus 1 to be used as plural virtual machines. The virtual machine monitor 40 may be referred to as a "managing unit". The virtual machine monitor 40 controls the virtual machines operating on the computer apparatus 1. For example, the virtual machine monitor 40 controls communications among the virtual machines.

The computer apparatus 1 also includes hardware 50, which may include a CPU (Central Processing Unit) 51, a memory 52 such as a RAM (Random Access Memory), a storage unit 53 such as a HDD (Hard Disk Drive), and one or more devices 55. The managing VM 10, the driver VM 20, the guest VM 30, and the virtual machine monitor 40 may be realized by the hardware 50 of the computer apparatus 1, such as the CPU 51 and the memory 52, and a software program. For example, a program that can be executed by the computer apparatus 1 may be stored in the storage unit 53, read into the memory 52, and then executed by the CPU 51. The computer apparatus 1 may be configured to read the program directly from a portable recording medium and perform a process in accordance with the program. The computer apparatus 1 may also be configured to perform a process in accordance with a program each time the program is transferred from a server computer. The program may be recorded in a non-transitory recording medium that can be read by the computer apparatus 1.

The managing VM 10 is a virtual machine in which a managing OS for managing the overall virtualized system is operated. The managing VM 10 may be booted upon turning on the computer apparatus 1 before other VM's in order to control the booting or terminating of other VM's or perform access management among the VM's.

The managing VM 10 includes a managing VM error managing unit 100, a device use information storage unit 110, and a communication processing unit 120. The managing VM error managing unit 100 monitors the operation of the device driver and determines whether there is an error in the device driver. The managing VM error managing unit 100, upon detection of an error in the device driver or upon reception of a notice of device driver error detection from another VM, performs an error recovery control. The error recovery control may include determining or indicating a recovery method for the erroneous device driver. The managing VM error managing unit 100, as a functional unit for performing a device driver error recovery control, includes a receiving unit 101, a determining unit 102, an error recovery control information storage unit 103, and a transmitting unit 104.

The receiving unit 101 receives error detection information from the VM that has detected a device driver error. When the managing VM 10 itself has detected a device driver error, the receiving unit 101 obtains the error detection information from the managing VM error managing unit 100 of the managing VM 10. When another VM has detected a device driver error, the receiving unit 101 obtains the error detection information from the error-detecting VM by inter-VM communication via the virtual machine monitor 40.

The error detection information includes information of an error type and information of a device type. The error type may indicate types of error that can occur in the device driver. The error type information included in the error detection information may indicate the type of detected error. The device type indicates the type of the one or more devices 55 which may be implemented on or connected to the computer apparatus 1. For utilization of the devices 55, a device driver for the corresponding device 55 is used. The device type information included in the error detection information may indicate the type of the device driver in which an error is detected.

The determining unit 102 acquires, from the error recovery control information stored in the error recovery control information storage unit 103, an error recovery range and an error recovery method that correspond to the error type and the device type included in the received error detection information. The error recovery range indicates a range of components for which an error recovery process is performed, including the type of VM as an error recovery process target. The type of VM may indicate a category of a VM based on its purpose or features, such as "driver VM" or "guest VM". The error recovery method may indicate the contents of a recovery process that the VM's in the error recovery range are caused to perform.

The error recovery control information storage unit 103 is a computer-accessible storage unit in which the error recovery control information is stored. The error recovery control information includes information defining the error recovery range and the error recovery method corresponding to the error type and the device type. For example, the error recovery control information according to the present embodiment includes information defining a combination of the type of VM as an error recovery process target and the contents of the recovery process that the VM of the corresponding type is caused to perform, the combination corresponding to the combination of the type of device driver and the type of error that may occur in the device driver.

The transmitting unit 104 identifies a VM as an error recovery target based on the acquired error recovery range, and transmits error recovery instructing information to the identified error recovery target VM, requesting the execution of the acquired error recovery method. Thus, the error recovery instructing information includes information for instructing the error recovery target VM to execute the contents of the recovery process indicated in the acquired error recovery method.

The device use information storage unit 110 is a computer-accessible storage unit in which device use information is stored. The device use information indicates a correspondence relationship, for each of the devices 55 used in the computer apparatus 1, between the driver VM 20 having a device driver corresponding to the device 55 and the guest VM 30 that uses the device 55 via the driver VM 20. The device use information stored in the device use information storage unit 110 includes general information that is utilized not just for an error recovery control according to the present embodiment, but also for referencing or updating a status of the device driver during an initialization process, a terminating process, or a normal operation.

When the acquired error recovery range includes a guest VM 30, the transmitting unit 104 identifies from the device use information the guest VM 30 corresponding to the driver VM 20 identified by the device type indicated by the error detection information as an error recovery target VM. The transmitting unit 104 transmits error recovery instructing information to the guest VM 30 identified as the error recovery target VM. By using the device use information, the error recovery target VM can be easily identified. The communication processing unit 120 may process message communications between the driver VM 20 and the guest VM 30 regarding an error detection report or an error recovery instruction.

The driver VM 20 is a device driver virtual machine for operating the device driver that controls the corresponding device 55. A plurality of the driver VM's 20 may be booted for various types of the devices 55. The driver VM 20 includes a back-end driver 21, a driver VM error managing unit 22, and a communication processing unit 23.

The back-end driver 21 is a back-end device driver that actually controls the device 55 in response to a device control request from the front-end driver 31 of the guest VM 30. The driver VM error managing unit 22 monitors the operation of the device driver and determines whether there is an error in the device driver. Upon detection of an error in the device driver, the driver VM error managing unit 22 transmits error detection information to the managing VM error managing unit 100 of the managing VM 10. The driver VM error managing unit 22 also performs an error recovery process in accordance with the error recovery instructing information received from the managing VM 10. The communication processing unit 23 may process message communications with the managing VM 10 regarding an error detection report or an error recovery instruction.

The guest VM 30 is a user virtual machine in which a guest OS capable of operating an application used by a user is operated. Depending on the mode of use of the computer apparatus 1, a plurality of the guest VM's 30 may be booted. The guest VM 30 includes a front-end driver 31, a guest VM error managing unit 32, and a communication processing unit 33.

The front-end driver 31 is a front-end device driver that requests the back-end driver 21 of the driver VM 20 to control the device 55 through a device control request when control to the device 55 arises in the guest VM 30.

The guest VM error managing unit 32 monitors the operation of the device driver and determines whether there is an error in the device driver. Upon detection of an error in the device driver, the guest VM error managing unit 32 transmits error detection information to the managing VM error managing unit 100 of the managing VM 10. Further, the guest VM error managing unit 32 performs an error recovery process in accordance with the error recovery instructing information received from the managing VM 10.

The communication processing unit 33 may process message communications with the managing VM 10 regarding an error detection report or an error recovery instruction.

Next, a process of controlling the device 55 from the guest VM 30 in the computer apparatus 1 illustrated in FIG. 1 is described. In the computer apparatus 1, the device 55, which may be implemented on or connected to the computer apparatus 1, is shared by the guest VM's 30 that operate on the computer apparatus 1. For utilization of the device 55, which may include various devices, a device driver corresponding to each device 55 is used. If the device drivers for the various devices 55 are provided for each guest VM 30, the resources allocated to each guest VM 30 are used by the multiple device drivers.

In the computer apparatus 1, a split driver technology is introduced by which the device driver is separated into the front-end driver 31 and the back-end driver 21 so that the device 55 and its device driver can be commonly utilized by the plural guest VM's 30. In this technology, the back-end driver 21, which actually performs the process of controlling the device 55 and that has a large program size, is provided in the driver VM 20. On the other hand, the front-end driver 31, which performs the process of requesting the back-end driver 21 to control the device 55 and which has a small program size, is provided in each guest VM 30. The guest VM's 30 may share the back-end driver 21 of the driver VM 20 via their own front-end drivers 31. Thus, in the computer apparatus 1, the resources load of the guest VM 30 due to the implementation of device driver is reduced by the above technology.

In FIG. 1, the broken-line arrows indicate device control communications. The guest VM 30, when using the device 55, sends a device control request to the back-end driver 21 of the driver VM 20 via the front-end driver 31, instead of directly controlling the device 55. In the driver VM 20, the back-end driver 21 performs the process of actually controlling the device 55 in accordance with the device control request from the front-end driver 31 of the guest VM 30.

Next, an error recovery control upon occurrence of a device driver error in the computer apparatus 1 is described. In the computer apparatus 1 of FIG. 1, upon occurrence of a device driver error, error recovery may be attempted by rebooting the entire virtualized system including the virtual machine monitor 40. However, in this case, the rebooting operation involves termination or rebooting of application programs or guest VM's 30 that are not related to the erroneous device driver. Further, the rebooting of the entire virtualized system may take a very long time.

Thus, in the computer apparatus 1, it is preferable to prevent application programs or guest VM's 30 unrelated to the erroneous device driver from being affected by the error recovery control so that they can continue operating. It is also preferable to minimize the time between device driver error detection and recovery. However, in the configuration of the device driver in the above-described virtualized system, it is not easy to detect device driver error or limit the error recovery process within a range such that the process does not affect processes unrelated to the error because the single device driver is related to the plural VM's.

In the following, an error recovery control which solves the above problems is described. In FIG. 1, the bold arrows indicate communications related to the error detection and recovery control. In the computer apparatus 1, each VM has an error detection functional unit configured to monitor the operation of the device driver and determine if there is an error. The error detection functional units of the managing VM 10, the driver VM 20, and the guest VM 30 is provided by the managing VM error managing unit 100, the driver VM error managing unit 22, and the guest VM error managing unit 32, respectively.

Upon detection of a device driver error, the error detection function unit of the corresponding VM sends a report of error detection information regarding the device driver error to an error recovery control unit of the managing VM 10. The managing VM error managing unit 100 of the managing VM 10 provides the error recovery control unit as well as the error detection function unit.

FIG. 2 is a flowchart of an error recovery control process in the managing VM error managing unit according to the present embodiment. In the managing VM error managing unit 100 of the managing VM 10, the receiving unit 101 receives the error detection information from the VM that has detected a device driver error, via the communication processing unit 120 (step S10).

The determining unit 102 identifies the type of error and the type of the device driver in which the error has occurred from the error detection information (step S11). The error detection information includes information indicating the type of error, information indicating the type of the device driver in which the error has occurred, information of the VM that has detected and reported the error, and information of the driver VM 20 in which the device driver error has occurred.

The determining unit 102 then acquires a combination of an error recovery range and an error recovery method corresponding to the combination of the identified error type and device type from the error recovery control information stored in the error recovery control information storage unit 103 (step S12). Depending on the device driver type and the type of error, the range of the VM's in which a recovery process is performed or the contents of the recovery process vary. In the error recovery control information, correspondence between the types of device driver and error, the ranges of VM's for recovery process, and the contents of the recovery process is defined in advance.

The transmitting unit 104 identifies the error recovery target VM from the acquired information of the error recovery range (step S13). For example, the transmitting unit 104, when the error recovery range indicates the back-end driver 21 of the driver VM 20 in which a device driver error has occurred, identifies the driver VM 20 as the error recovery target VM. When the error recovery range indicates the guest VM 30 that shares the device driver in which an error has occurred, the transmitting unit 104 extracts all of the guest VM's 30 that share the device driver in which the error has occurred from the device use information stored in the device use information storage unit 110, and identifies those guest VM's 30 as the error recovery target VM's.

The transmitting unit 104 transmits error recovery instructing information to the identified error recovery target VM via the communication processing unit 120, instructing the execution of a recovery process indicated in the acquired error recovery method information (step S14). In response to the error recovery instructing information, the error recovery target VM performs the error recovery process in accordance with the error recovery instructing information.

Thus, in the error recovery control according to the present embodiment, in the event of a device driver error in the virtualized system, an appropriate error recovery process for the detected error is performed only within an appropriate range of VM's in view of the detected error. Thus, the system can continue to operate without terminating application programs or guest VM 30 that are not related to the erroneous device driver, thus increasing the reliability of the system. Further, the error recovery method can be varied depending on the type of device driver error or the type of device driver, so that the time for recovery from the error can be reduced.

EXAMPLE

In the following, a device driver error recovery control according to an Example is described. FIG. 3 is a block diagram of a computer apparatus 1a according to the Example. The computer apparatus 1a is an example of the computer apparatus 1 of FIG. 1 and may include a portable terminal such as a cellular phone.

In recent years, hardware resources of embedded devices and portable terminals have become more robust due to improvements in CPU performance and increases in memory capacities. As a result, it has become possible to introduce virtualization technology into embedded devices or portable terminals so that plural OS's can be operated in a single device. In such an embedded device or portable terminal, various types of device drivers may be introduced in order to handle various types of devices. Because the development cycles for embedded devices and portable terminals are becoming increasingly shorter, it may be preferred to develop a device driver for a new device and verify its operation in a short period, and embed it in a system for shipping.

The size of a device driver program can be large, and the proportion of a device driver in an entire system program is steadily increasing. Because of the short period for developing and verifying the device driver for a new device, device drivers tend to have lower reliability compared to other modules. Thus, a mechanism may be provided for enabling a system as a whole to operate stably even when an error occurs in a device driver.

Thus, in the computer apparatus 1a of FIG. 3, an error recovery control is performed quickly upon occurrence of a device driver error while allowing the system to continue operating. The computer apparatus 1a, which is a portable terminal in which virtualization technology is introduced, includes a managing VM 10, two driver VM's 20, two guest VM's 30, and a virtual machine monitor 40. In the computer apparatus 1a, the VM's and the virtual machine monitor 40 have the same configurations as those of the computer apparatus 1 of FIG. 1. For example, while not illustrated, the managing VM error managing unit 100 of the managing VM 10 of the computer apparatus 1a includes the receiving unit 101, the determining unit 102, and the transmitting unit 104 as well as the error recovery control information storage unit 103.

The hardware 50 of the computer apparatus 1a includes a wireless LAN device 55a and a SD memory device 55b. While not illustrated in FIG. 3, the computer apparatus 1a may include the CPU 51, the memory 52, and the storage unit 53 illustrated in FIG. 1 in the hardware 50.

In the computer apparatus 1a, the two driver VM's 20 are provided for controlling the two devices 55a and 55b. Specifically, the wireless LAN device 55a is controlled by a driver VM 20a. The driver VM 20a includes a back-end driver (wireless LAN) 21a corresponding to the wireless LAN device 55a. The SD memory device 55b is controlled by a driver VM 20b. The driver VM 20b includes a back-end driver (SD memory) 21b corresponding to the SD memory device 55b.

In the computer apparatus 1a, the two guest VM's 30a and 30b are operated. The guest VM 30a utilizes the SD memory device 55b. The guest VM 30a includes a front-end driver (SD memory) 31a corresponding to the SD memory device 55b. The guest VM 30a does not utilize the wireless LAN device 55a. The guest VM 30b utilizes the wireless LAN device 55a and the SD memory device 55b. The guest VM 30b includes a front-end driver (wireless LAN) $31b_1$ corresponding to the wireless LAN device 55a and a front-end driver (SD memory) $31b_2$ for the SD memory device 55b. Thus, the SD memory device 55b is shared by the guest VM 30a and the guest VM 30b.

In FIG. 3, each VM has a domain ID as information uniquely identifying the VM. The managing VM 10 has the domain ID "0". The driver VM 20a has the domain ID "1". The driver VM 20b has the domain ID "2". The guest VM 30a has the domain ID "3". The guest VM 30b has the domain ID "4".

FIG. 4 illustrates an example of error recovery control information 150 which is stored in the error recovery control information storage unit 103 in the computer apparatus 1a of FIG. 3. The error recovery control information 150 has entries for "error type", "device type", "error recovery range", and "error recovery method".

The "error type" indicates the type of device driver error. In the illustrated example of FIG. 4, the error recovery control information 150 shows two error types, i.e., "no back-end-driver response" and "memory protection violation". "No back-end-driver response" indicates that there is no response from the back-end driver 21 in response to a device operation request transmitted by the guest VM 30 to the back-end driver 21 on the driver VM 20 via the front-end driver 31 of the VM 30. More specifically, the guest VM error managing unit 32 of the guest VM 30 determines that a no-back-end-driver-response error has occurred when no response to the device operation request is received from the back-end driver 21 for more than a predetermined time. "Memory protection violation" indicates an error as a result of an unauthorized memory access made by the device driver. In the event of a "memory protection violation", the virtual machine monitor 40 sends an exception notice to the corresponding VM. Based on the notice, the error managing unit of the VM detects the occurrence of error.

The "device type" entry indicates the type of the device 55 used in the computer apparatus 1a. In the illustrated example of FIG. 4, the error recovery control information 150 shows two kinds of devices, i.e., the wireless LAN device 55a and the SD memory device 55b. From the viewpoint of device driver error, the type of device 55 indirectly indicates the type of device driver corresponding to the device 55.

The "error recovery range" entry indicates the range of components in which a recovery process is performed upon error. In the illustrated example of FIG. 4, the error recovery range entry shows the type of VM for the recovery process and a corresponding range of recovery targets in the VM in parentheses. The type of VM may include the driver VM 20 and the guest VM 30.

For example, it is supposed that, in the computer apparatus 1a, a "no-back-end-driver-response" error has occurred in the device driver corresponding to the wireless LAN device 55a. In this case, the error recovery control information 150 indicates that, based on the error recovery range corresponding to the combination of "wireless LAN" and "no-back-end-driver-response", it is necessary to perform a recovery process for the back-end driver (wireless LAN) 21a of the driver VM 20a corresponding to the wireless LAN device 55a. Similarly, it is indicated that it is necessary to perform a recovery process for the front-end driver (wireless LAN) $31b_1$ of the guest VM 30b that uses the wireless LAN device 55a.

The "error recovery method" entry indicates an error recovery method for the corresponding error recovery range. Specifically, the error recovery method entry of the error recovery control information 150 of FIG. 4 indicates a recovery process to be performed in the VM in the error recovery range and an optional designation (in parentheses) indicating whether initialization of the device 55 is appropriate. The determining unit 102, upon occurrence of a device driver error, refers to the error recovery method entry of the error recovery control information 150 and determines the recovery method.

For example, it is supposed that in the computer apparatus 1a, there has been no response from the back-end driver (SD memory) 21b of the driver VM 20b for a predetermined time while the guest VM 30a is operating the SD memory device 55b. In this case, in accordance with the error recovery method determined by the error recovery control information 150 of FIG. 4, the back-end driver (SD memory) 21b of the driver VM 20b is rebooted. In this case, the SD memory device 55b is not initialized in accordance with the optional designation associated with the error recovery method. Also, a detaching process and an attaching process are performed for the front-end driver (SD memory) 31a of the guest VM 30a and the front-end driver (SD memory) 31$b_2$ of the guest VM 30b.

Depending on the error type and the device type, initialization of the device 55 is not appropriate when rebooting the device driver. In such a case, unnecessary processes can be omitted through the optional designation associated with the error recovery method in the error recovery control information 150, so that a faster device driver recovery process can be realized.

FIG. 5 illustrates an example of the error recovery control information 150 according to the present embodiment, illustrating its data structure and definitions of constants. In the example of FIG. 5, a data structure of the error recovery control information 150 is implemented in the C code and constants are defined in each entry.

In an error type definition portion, a value "1" is defined for "no-back-end-driver-response". A value "2" is defined for "memory protection violation". In a device type definition portion, a value "1" is defined for "wireless LAN" and a value "2" is defined for "SD memory". A value "3" is defined for "LCD (Liquid Crystal Display)" and a value "4" is defined for "keypad". In an error recovery range definition portion, a value "1" is defined for "back-end driver of driver VM". A value "2" is defined for "entire driver VM". A value "3" is defined for "entire guest VM". A value "4" is defined for "front-end driver of guest VM". In an error recovery method definition portion, a value "1" is defined for "reattaching of driver". A value "2" is defined for "rebooting of driver". A value "3" is defined for "rebooting of VM". A value "4" is defined for "system reboot". In an error recovery method option definition portion, a value "1" is defined for "device initialization not appropriate".

In the following description, it is assumed that communications regarding error recovery control are performed using the values defined in FIG. 5.

FIG. 6 illustrates an example of device use information 151 according to the present embodiment. The device use information 151 is stored in the device use information storage unit 110 of the computer apparatus 1a of FIG. 3. The device use information 151 records correspondence relationships between the driver VM 20 and the guest VM 30 in which the back-end driver 21 and the front-end driver 31, respectively, of the device driver corresponding to each device 55 used in the virtualized system of the computer apparatus 1a are operated.

The device use information 151 includes general control information that is used not just during the error recovery control process but also during an initialization process, a terminating process, or a normal operation process in order to refer to or update the status of each device driver. The device use information 151 may be used to determine to which guest VM the managing VM 10 may issue an error recovery instruction during the error recovery control process.

The device use information 151 of FIG. 6 includes entries for device type, front-end VM, back-end VM, and status.

The "device type" entry indicates the type of the device 55 used in the computer apparatus 1a. In the device use information 151 of FIG. 6, the device type indicates the wireless LAN device 55a (Device ID=1) or the SD memory device 55b (Device ID=2). From the viewpoint of device driver error, the type of the device 55 indirectly indicates the type of the device driver corresponding to the device 55. The "front-end VM" entry indicates the guest VM 30 having the front-end driver 31 of the device driver corresponding to the device 55. The "back-end VM" entry indicates the driver VM 20 having the back-end driver 21 of the device driver corresponding to the device 55. The "status" entry indicates, regarding the device driver corresponding to the device 55, a status of connection between the front-end driver 31 of the guest VM 30 and the back-end driver 21 of the driver VM 20. For example, the status "connected" indicates that the front-end driver 31 of the guest VM 30 and the back-end driver 21 of the driver VM 20 have been initialized and that a process relating to a device operation request can be performed.

For example, the device use information 151 of FIG. 6 indicates that, with regard to the wireless LAN device 55a with the device ID=1, the back-end driver (wireless LAN) 21a is operated in the driver VM 20a with the domain ID=1. The device use information 151 also indicates that the front-end driver (wireless LAN) 31b1 is operated in the guest VM 30b with the domain ID=4. The device use information 151 also indicates that the back-end driver (wireless LAN) 21a and the front-end driver (wireless LAN) 31$b_1$ are in the connected status.

The device use information 151 also indicates that, with regard to the SD memory device 55b with the device ID=2, the back-end driver (SD memory) 21b is operated in the driver VM 20b with the domain ID=2. It is also indicated that the front-end driver (SD memory) 31a is operated in the guest VM 30a with the domain ID=3 and that the front-end driver (SD memory) 31$b_2$ is operated in the guest VM 30b with the domain ID=4. Further, it is indicated that the back-end driver (SD memory) 21b and each front-end driver 31 are in the connected status.

Supposing that an error has occurred in the device driver corresponding to the wireless LAN device 55a, it is known from the device use information 151 of FIG. 6 that the guest VM 30b with the domain ID=4 is the only guest VM 30 that is using the wireless LAN device 55a. Thus, it is learned that the error recovery instructing information may to be sent to the guest VM 30b with the domain ID=4.

Supposing that an error has occurred in the device driver corresponding to the SD memory device 55b, it is known from the device use information 151 of FIG. 6 that the guest VM 30a with the domain ID=3 and the guest VM 30b with the domain ID=4 are the two guest VM's 30 that are using the SD memory device 55b. Thus, it is learned that the error recovery instructing information may be sent to the guest VM 30a with the domain ID=3 and the guest VM 30b with the domain ID=4.

FIGS. 7A, 7B, and 7C illustrate examples of data structures of information used in communications for error recovery control according to the Example. FIG. 7A illustrates an example of the data structure of the error detection information which is transmitted to the managing VM 10 from the VM that has detected a device driver error, using inter-VM communication via the virtual machine monitor 40.

The error detection information includes information of a notice-source domain ID ("Source Domain ID"), an error-originating domain ID ("Error Domain ID"), an error type ("Error No"), and a device type ("Device ID"). The notice-source domain ID indicates the domain ID of the VM that has detected the device driver error and transmitted the error detection information. The error-originating domain ID indicates the domain ID of the VM in which the device driver error has occurred. The error type indicates the type of the detected error. The device type indicates the type of the device 55 corresponding to the device driver in which the error has occurred.

FIG. 7B illustrates an example of the data structure of the error recovery instructing information. The error recovery instructing information is transmitted from the managing VM 10 to the error recovery target VM using inter-VM communication via the virtual machine monitor 40 upon determination of an error recovery method in the managing VM 10. The error recovery instructing information includes information of an error recovery range ("Rcv_range"), an error recovery method ("Rcv_method"), an error recovery method option ("Rcvopt"), and a device type ("Device ID"). The error recovery range indicates the range of components in which an error recovery process is performed. The error recovery method indicates the contents of the recovery process the error recovery target VM is caused to perform. The error recovery method option indicates an optional designation associated with the error recovery method. In the illustrated example, the error recovery method option designates whether initialization of the device 55 is appropriate. The device type indicates the type of the device 55 corresponding to the device driver in which the error has occurred.

FIG. 7C illustrates an example of data structure of the error recovery result information. The error recovery result information is transmitted to the managing VM 10 using inter-VM communication via the virtual machine monitor 40 after the error recovery process is performed by the error recovery target VM as instructed. The error recovery result information includes information of a notice-source domain ID ("Source Domain ID"), a device type ("Device ID"), and an error recovery result ("result"). The notice-source domain ID indicates the domain ID of the VM that has performed the error recovery process and that has transmitted the error recovery result information. The device type indicates the type of the device 55 corresponding to the device driver in which the error has occurred. The error recovery result indicates whether the error recovery has been successful.

FIG. 8 is a sequence chart of an error recovery control process in the event of a device driver error assuming that a "no-back-end-driver-response" error has been detected in the computer apparatus 1a of FIG. 3 when the wireless LAN device 55a is used by the guest VM 30b.

The front-end driver (wireless LAN) $31b_1$ of the guest VM 30b issues a device operation request, such as a data read request, to the back-end driver (wireless LAN) 21a of the driver VM 20a (step S100). At this time, the front-end driver (wireless LAN) $31b_1$ transmits a timer setting request to the guest VM error managing unit 32b (step S101). Thus, the time of issuance of the device operation request is registered in the guest VM error managing unit 32b.

In the absence of a response from the back-end driver (wireless LAN) 21a within a predetermined period after the time of issuance of the device operation request, the guest VM error managing unit 32b of the guest VM 30b determines that a "no-back-end-driver-response" error has occurred (step S102).

The guest VM error managing unit 32b of the guest VM 30b transmits, via the virtual machine monitor 40, the error detection information to the managing VM error managing unit 100 of the managing VM 10 (step S103). The transmitted error detection information includes the notice-source domain ID=4 (=guest VM 30b), the error-originating domain ID=1 (=driver VM 20a), the error type=1 (="no-back-end-driver-response"), and the device type=1 (="wireless LAN").

Upon reception of the error detection information, the managing VM error managing unit 100 of the managing VM 10 performs an error recovery control process (step S104). For example, the managing VM error managing unit 100 refers to the error recovery control information 150 in the error recovery control information storage unit 103 based on the error detection information and determines the error recovery range and the error recovery method.

For example, the entries in the error recovery control information 150 of FIG. 4 are searched based on the definitions of the values illustrated in FIG. 5 to find an entry corresponding to error type=1 and device type=1. In the illustrated example, two entries of (error type, device type, error recovery range, error recovery method, error recovery method option)=(1, 1, 1, 2, 0) and (1, 1, 4, 1, 0) are found in the error recovery control information 150. Thus, it is learned that it is necessary to perform error recovery in the driver VM 20a corresponding to the wireless LAN device 55a and the guest VM 30b that is using the back-end driver (wireless LAN) 21a of the driver VM 20a.

The managing VM error managing unit 100 refers to the device use information 151 of FIG. 6 and identifies the error recovery target VM. Specifically, it is known from the device use information 151 that the driver VM 20 corresponding to the device type=1 (="wireless LAN") is the driver VM 20a with the domain ID=1. It is also known from the device use information 151 that the guest VM 30 corresponding to the device type=1 (="wireless LAN") is the guest VM 30b with the domain ID=4.

The managing VM error managing unit 100 transmits the error recovery instructing information to the error recovery target driver VM 20a (step S105). The transmitted error recovery instructing information includes information of the error recovery range=1 (="back-end driver"), the error recovery method=2 (="driver reboot"), the error recovery method option=0 (="device initialization appropriate"), and the device type=1 (="wireless LAN"). Thus, the instruction issued to the driver VM 20a indicates rebooting of the back-end driver (wireless LAN) 21a including initialization of the wireless LAN device 55a.

The managing VM error managing unit 100 also transmits the error recovery instructing information to the error recovery target guest VM 30b (step S106). The transmitted error recovery instructing information includes information of the error recovery range=4 (="front-end driver"), the error recovery method=1 (="reattaching of driver"), the error recovery method option=0 (="device initialization appropriate"), and the device type=1 (="wireless LAN"). Thus, the instruction issued to the driver VM 20a indicates reconnecting of the front-end driver (wireless LAN) $31b_1$.

Upon reception of the error recovery instructing information, the driver VM error managing unit 22a of the driver VM 20a performs rebooting of the back-end driver (wireless LAN) 21a (step S107). Upon reception of the error recovery instructing information, the guest VM error managing unit 32b of the guest VM 30b disconnects the erroneous device driver (step S108).

After the rebooting of the back-end driver (wireless LAN) 21a is completed, the driver VM error managing unit 22a of the driver VM 20a sends the error recovery result information to the managing VM error managing unit 100 (step S109). The transmitted error recovery instructing information includes information of the notice-source domain ID=1 (=driver VM 20a), the device type=1 (="wireless LAN"), and the error recovery result=1 (=successful).

Upon reception of the error recovery result information, the managing VM error managing unit 100 further sends the error recovery result information to the guest VM 30b (step S110). The transmitted error recovery result information includes information of the notice-source domain ID=0 (=managing VM 10), the device type=1 (="wireless LAN"), and the error recovery result=1 (=successful). Upon reception of the error recovery result information, the guest VM error managing unit 32b of the guest VM 30b attaches the device driver that has been recovered from error (step S111). Thereafter, the device driver of the wireless LAN device 55*a* can be utilized.

Thus, in the error recovery control process according to the present embodiment, in the event of a device driver error in a virtualized system, the error is detected and an appropriate recovery method is selected so that the system can continue operating, thus increasing the reliability of the system. Further, the error recovery method can be modified depending on the type of device driver error or the device type, so that the time for recovery from error can be reduced.

The error recovery control according to the present embodiment is particularly effective in virtualization of a cellular phone. The types of devices implemented on cellular phones are increasing, with the corresponding increase in the level of sophistication and complexity in the functionality of the device drivers for controlling the various types of devices. Because the development cycles of cellular phones are short, error may be easily caused in the device drivers. Thus, it is preferable for a cellular phone system including the newly developed device driver to operate stably.

In the error recovery control process according to the present embodiment, when an error develops in a device driver in a virtualized portable system, the error can be quickly detected and a minimum range of components can be rebooted. Thus, error recovery can be attained efficiently while the overall virtualized system is allowed to continue operating.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority or inferiority of the invention.

For example, while the managing VM 10 includes the functional units for error recovery control in accordance with the foregoing embodiment, the functional units for error recovery control may be provided by a dedicated VM independently from the managing VM 10.

Although the embodiments have been described in detail, it should be understood that the various changes, substitutions, and alterations could be made hereto without departing from the spirit and scope of the invention.

What is claimed is:

1. A computer apparatus comprising:
a managing unit configured to realize virtual computers including device driver virtual computers and user virtual computers, the user virtual computers communicating with various devices via the device driver virtual computers under the control of the managing unit;
a receiving unit configured to receive error detection information from one of the virtual computers that has detected an error in an error-detected device driver of device drivers that is used for communication with one of the devices, the error detection information including a type of the error-detected device driver in which the error is detected and a type of the error;
an error recovery control information storage unit configured to store error recovery control information defining, in association with types of the device drivers and types of errors that can occur in the device drivers, types of the virtual computers for which recovery is performed when corresponding types of the errors occur recovery processes;
a determination unit configured to acquire, from the error recovery control information, a type of virtual computer and a recovery process determined to match the type of the error-detected device driver and the type of the error indicated in the received error detection information subsequent to detection of the error in the error-detected device driver; and
a transmitting unit configured to transmit a recovery instruction to a target virtual computer among the virtual computers that corresponds to the acquired type of virtual computer related to the error of the error-detected device driver to cause the target virtual computer to perform the acquired recovery process having a predetermined range.

2. The computer apparatus according to claim 1, further comprising:
a device use information storage unit configured to store device use information indicating correspondence between the device driver virtual computers and the user virtual computers that use the devices via the device driver virtual computers,
wherein when the acquired type of virtual computer indicates the user virtual computers, the transmitting unit identifies based on the device use information a corresponding user virtual computer of the user virtual computers that corresponds to one of the device driver virtual computers identified based on the type of the error-detected device driver in the received error detection information, and transmits the recovery instruction to the corresponding user virtual computer.

3. A computer apparatus comprising:
a memory configured to store error recovery control information defining, in association with types of device drivers and types of errors that can occur in the device drivers, types of virtual computers for which recovery is performed when corresponding types of the errors occur and recovery processes; and
a processor configured to execute a process including
realizing the virtual computers including device driver virtual computers and user virtual computers, the user virtual computers communicating with various devices via the device driver virtual computers under the control of a managing unit of the computer apparatus;
receiving error detection information from one of the virtual computers that has detected an error in an error-detected device driver of the device drivers that is used for communication with one of the devices, the error detection information including a type of the error-detected device driver in which the error is detected and a type of the error;
acquiring, from the error recovery control information, a type of virtual computer and a recovery process determined to match the type of the error-detected device driver and the type of the error indicated in the received error detection information subsequent to detection of the error in the error-detected device driver; and
transmitting a recovery instruction to a target virtual computer among the virtual computers that corresponds to the acquired type of virtual computer related to the error of the error-detected device driver to cause the target virtual computer to perform the acquired recovery process having a predetermined range.

4. A non-transitory computer-readable recording medium storing a program for causing a computer apparatus to perform a method, the method comprising:

realizing virtual computers including device driver virtual computers and user virtual computers, the user virtual computers communicating with various devices via the device driver virtual computers under the control of a managing unit of the computer apparatus;

receiving error detection information from one of the virtual computers that has detected an error in an error-detected device driver of the device drivers that is used for communication with one of the devices, the error detection information including a type of the error-detected device driver in which the error is detected and a type of the error;

acquiring, from error recovery control information, a type of virtual computer and a recovery process determined to match the type of the error-detected device driver and the type of the error indicated in the received error detection information subsequent to detection of the error in the error-detected device driver, the error recovery control information defining, in association with types of the device drivers and types of errors that can occur in the device drivers, types of the virtual computers for which recovery is performed when the corresponding types of the errors occur and recovery processes corresponding to the types of the virtual computers; and transmitting a recovery instruction to a target virtual computer among the virtual computers that corresponds to the acquired type of virtual computer related to the error of the error-detected device driver to cause the target virtual computer to perform the acquired recovery process having a predetermined range.

5. An error recovery control method performed by a computer apparatus, the method comprising:

realizing virtual computers including device driver virtual computers and user virtual computers, the user virtual computers communicating with various devices via the device driver virtual computers under the control of a managing unit of the computer apparatus;

receiving error detection information from one of the virtual computers that has detected an error in an error-detected device driver of device drivers that is used for communication with one of the devices, the error detection information including a type of the error-detected device driver in which the error is detected and a type of the error;

acquiring, from error recovery control information, a type of virtual computer and a recovery process determined to match the type of the error-detected device driver and the type of the error indicated in the received error detection information subsequent to detection of the error in the error-detected device driver, the error recovery control information defining, in association with types of the device drivers and types of errors that can occur in the device drivers, types of the virtual computers for which recovery is performed when corresponding types of the errors occur and recovery processes corresponding to the types of the virtual computers; and transmitting a recovery instruction to a target virtual computer among the virtual computers that corresponds to the acquired type of virtual computer related to the error of the error-detected device driver to cause the target virtual computer to perform the acquired recovery process having a predetermined range.

\* \* \* \* \*